(No Model.)

A. CURRIER.
FASTENING DEVICE.

No. 601,998. Patented Apr. 5, 1898.

Attest
F. L. Middleton
C. S. Middleton

Inventor
Alfred Currier
by Ellis Spear
Atty

UNITED STATES PATENT OFFICE.

ALFRED CURRIER, OF GRAND RAPIDS, MICHIGAN, ASSIGNOR OF ONE-HALF TO WILLIAM POWERS PUTNAM, OF SAME PLACE.

FASTENING DEVICE.

SPECIFICATION forming part of Letters Patent No. 601,998, dated April 5, 1898.

Application filed June 25, 1897. Serial No. 642,285. (No model.)

*To all whom it may concern:*

Be it known that I, ALFRED CURRIER, a citizen of the United States, residing at Grand Rapids, in the county of Kent and State of Michigan, have invented certain new and useful Improvements in Fastening Devices, of which the following is a specification, reference being had therein to the accompanying drawings.

My invention relates to an improved fastening device which is particularly adapted to be used in connection with iron bedsteads constructed of tubing for securing the ornamental tops to the standards.

Although the device is particularly designed for the before-mentioned purpose, it may with equal facility and effect be used in place of the ordinary expansion-bolts for securing signs to store-fronts or for any of the other purposes for which said bolts are now or can be employed.

The invention includes an ordinary or improved form of bolt passing freely through the center of a block fitted within the tubing or hole in the structure to which the ornament or the like is to be secured and a spring-washer interposed between the head of the bolt and the block, said washer when flat being of greater length than the diameter of said tubing or hole.

The invention also includes the details of construction, as will be hereinafter described, and particularly pointed out in the claims.

Figure 1:
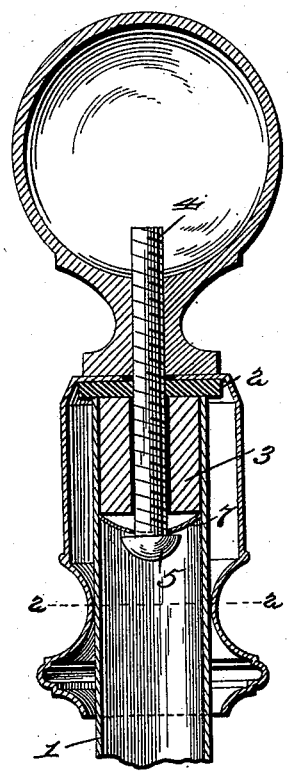
Figure 3:
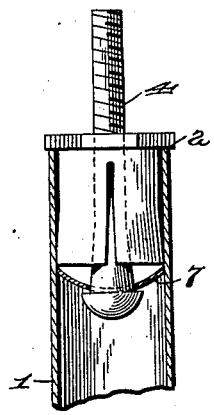
Figure 2:
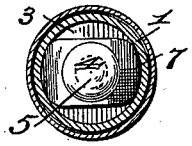

In the accompanying drawings, Figure 1 is a vertical sectional view of a portion of an iron bed-standard, showing the ornamental top secured in place. Fig. 2 is a cross-sectional view, and Fig. 3 is a view of modification showing only the tubing in section.

In the drawings only a portion of one of the standards of a bed constructed of tubing is shown, this portion 1 showing the upper end of the standard which is designed to be surmounted by an ornamental top of any description, as shown herein. In the upper end of the tubing 1 is located a tubular plug 3, said plug having a central opening therein, through which a bolt 4 freely passes, said bolt having a large head 5, that is located within the tubing, the stem thereof extending outside of the block and end of the tubing and having the nut 2 screwed thereon. Between the head and the plug and loosely held on the stem is a washer 7 of substantially oblong shape, the ends of which are slightly rounded. This washer when flat is of greater length than the interior diameter of the tubing, so that to insert said washer within the tubing it must be bent. When it has been inserted a sufficient depth into said tube, the nut 2 is screwed down on the stem, and as the lower face of the nut bears against the upper end of the tube it will draw the bolt upwardly and cause the head thereof to press upon the central part of the washer, and as the ends thereof are maintained in place tend to flatten the said washer and press its ends firmly against the wall of the tube, and thus securely lock the bolt, and thereby hold the bolt firmly in place.

The locking action of the washer may be supplemental by employing in connection therewith an expanding block. To this end the block is split centrally almost from end to end, or made sectional, and the stem of the bolt near the head made wedge-shaped. As the bolt thus formed is drawn forward it will expand the plug and press the washer out simultaneously, and thus provide a double holding means.

The washer in the construction shown in Figs. 1 and 2 is inserted within the tube in concave form, and the bolt-head presses upon the central portion thereof to expand the same. After the bolt is locked in place the ornamentation is screwed upon the threaded shank thereof, which projects out of the end of the tube. The nut in some cases may be dispensed with and the ornament be screwed directly down against the end of the tube to draw the bolt upwardly therein.

I claim as my invention—

1. In combination, the tubing, the cylindrical plug inserted therein having a plain face at right angles to the axis of the tube, the dished washer having its concave side in proximity to said plain face, the bolt passing through the washer and plug and having a head bearing against the convex side of the washer, and the threaded member engaging the threaded end of the bolt and adapted to draw the same up to straighten the concave washer, substantially as described.

2. In combination, the tube, the split cylindrical block, the dished washer abutting against the face of the block, the bolt passing through the washer and block and having a wedge-shaped portion operating in conjunction with the split portion of the block, and having also a head bearing against the convex side of the dished washer, and means threaded upon the end of the bolt for drawing upon it to spread the block and straighten the washer, substantially as described.

In testimony whereof I affix my signature in presence of two witnesses.

ALFRED CURRIER.

Witnesses:
M. J. KOLTS,
WM. H. DE CAMP.